United States Patent [19]

Steig

[11] 3,933,522

[45] Jan. 20, 1976

[54] ACCUMULATOR CELL

[75] Inventor: Hans Steig, Soest, Germany

[73] Assignee: Accumulatorenfabriken Wilhelm Hagen AG, Germany

[22] Filed: June 4, 1974

[21] Appl. No.: 476,322

[52] U.S. Cl............. 136/6 R; 136/134 R; 136/162; 136/166
[51] Int. Cl.² ..................................... H01M 10/00
[58] Field of Search .......... 136/135, 134, 166, 162, 136/111, 6 R, 6 E

[56] References Cited
UNITED STATES PATENTS

| | | | |
|---|---|---|---|
| 1,511,230 | 10/1924 | Martin | 136/6 E |
| 2,833,848 | 5/1958 | Marty | 136/111 |
| 2,834,827 | 5/1958 | Emeriat | 136/111 |
| 3,532,557 | 10/1970 | Sasagava | 136/162 X |
| 3,607,441 | 9/1971 | Mix | 136/135 S X |
| 3,615,867 | 10/1971 | Cich et al. | 136/135 S X |
| 3,674,566 | 7/1972 | Powers | 136/114 |
| 3,832,237 | 8/1974 | Kinsey | 136/166 X |
| 3,834,945 | 9/1974 | Jensen | 136/161 |

Primary Examiner—John H. Mack
Assistant Examiner—C. F. Lefevour
Attorney, Agent, or Firm—Burns, Doane, Swecker & Mathis

[57] ABSTRACT

A storage battery composed of a plurality of cells of substantially identical construction that are stacked vertically one on top of the other. The terminal posts are connected to the lower cells via conductors embedded in the battery housing walls. The liquid electrolyte in the various cells is allowed to flow through the separating bottom and top walls of the cells.

27 Claims, 8 Drawing Figures

ACCUMULATOR CELL

The invention relates to a storage battery cell with a generally cubic housing, with a plurality of cells which are located one above the other and each containing the electrolyte and positive and negative plates.

To increase the capacity of rechargeable batteries intended for vehicles such, for example, as lift trucks, one possibility is by enlarging the length of the elements. But there are limits because with enlargement of the length of the plate, there is a corresponding increase in the internal resistance within the cell. To reduce the internal resistance of nickel-cadmium batteries, the sets of plates have been subdivided as to height, whereby electric connections are guided from every set of partial plates directly to the poles. The main disadvantage is that cells in different levels of the storage battery must be produced separately.

A principal object of the present invention is to provide a novel battery having cells one above the other, but without requiring the separate, complete construction of every storage battery of a certain level.

Another object is to provide a novel battery cell arrangement wherein the facing topside and underside of the stacked cells are developed to complement each other in such a way that they can be built up with substantially identical cell construction into a compact stack having two fixedly arranged, electrically conductive connectors provided outside the housing, which are intended for connecting one of the poles with the corresponding pole of a similar cell disposed below or above it; and the the space in each cell for the liquid electrolyte communicates with the spaces of cells disposed above or below.

Storage battery cells with optimum lengths of plates and electric characteristics, representing elementary cells, may be produced in accord with the present invention whereby the increase in capacity is made available by stacking the various elementary cells. Moreover, a very stable arrangement from a mechanical point of view is assured on the basis of the natural weight of the battery stack. Thus, the most diverse arrangements of storage batteries can be realized according to the mechanical assembly technique, whereby practically only a single cell type must be fabricated.

Another object is to provide a novel stacked cell type of battery wherein the sealing ring is smooth and rests flatly on the connecting line. An eyebolt desirably presses a gasket against the connecting line, and may have at its underside two relatively angular annular projections extending inside or outside the connecting line, which are superimposed onto the cover material or on the material of the lead bushing in such a way that a complete sealing of the connecting line toward the outside will be achieved. The eyebolt advantageously consists of a plastic which has the strength required for the establishment of the screw connection, but which on the other hand is soft enough in order to impart a sufficient pliability to the angular projections to act as sealing lips.

Preferably, the unoccupied spaces around the pole connections after welding of the plastic parts are filled and sealed with a grouting of a plastic material. The cell containers themselves preferably have an outside height of 200 to 240 mm.

These and other objects will become more fully apparent from the claims, and from the description when read in conjunction with the appended drawings wherein:

Figure 2:
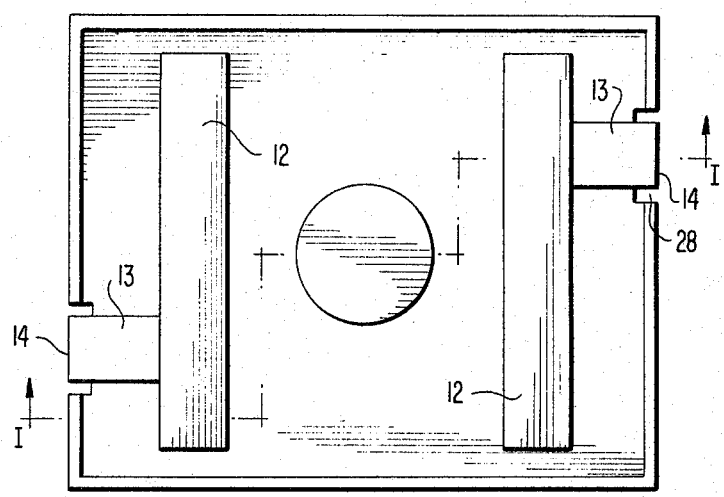
FIG. 2 is a top plan view of the battery of FIG. 1.
Figure 4:
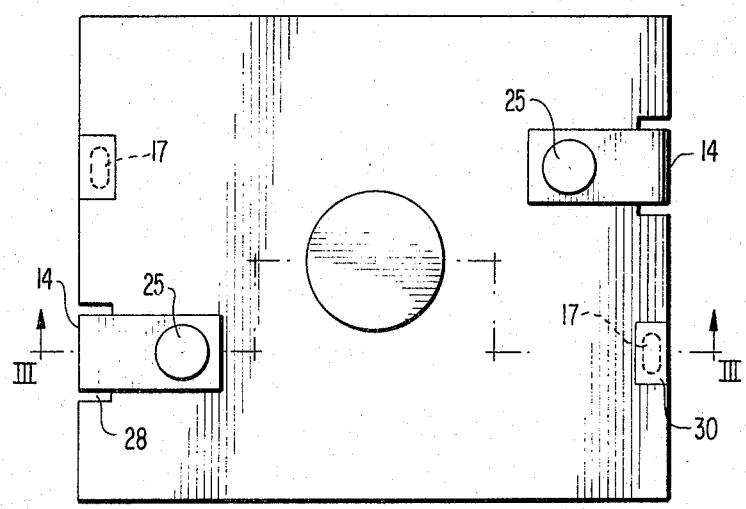
FIG. 4 is a top plan view of the battery of FIG. 3.

The storage battery cells of the invention have a housing 11 of a moldable electrolyte-resistant insulating material such as polypropylene, closed on all sides in a leak-proof manner with a leak-proof cover 19. Inside the housing 11, the elements 18 are disposed in a suitable manner on spaces 27. The plates of the same polarity, having plate lugs 12, are connected to one another by cell connectors 21. According to the invention, lead-through conductors 13 extend from the cell connectors through the walls of housing 11. Vertically disposed connectors 14, are shown in FIGS. 2 and 4 as being embedded in recesses or indentations 28 of the sidewalls of the housing 11. The connectors 14 are covered preferably with shrinking tubes or poured into synthetic resin.

Figure 3:
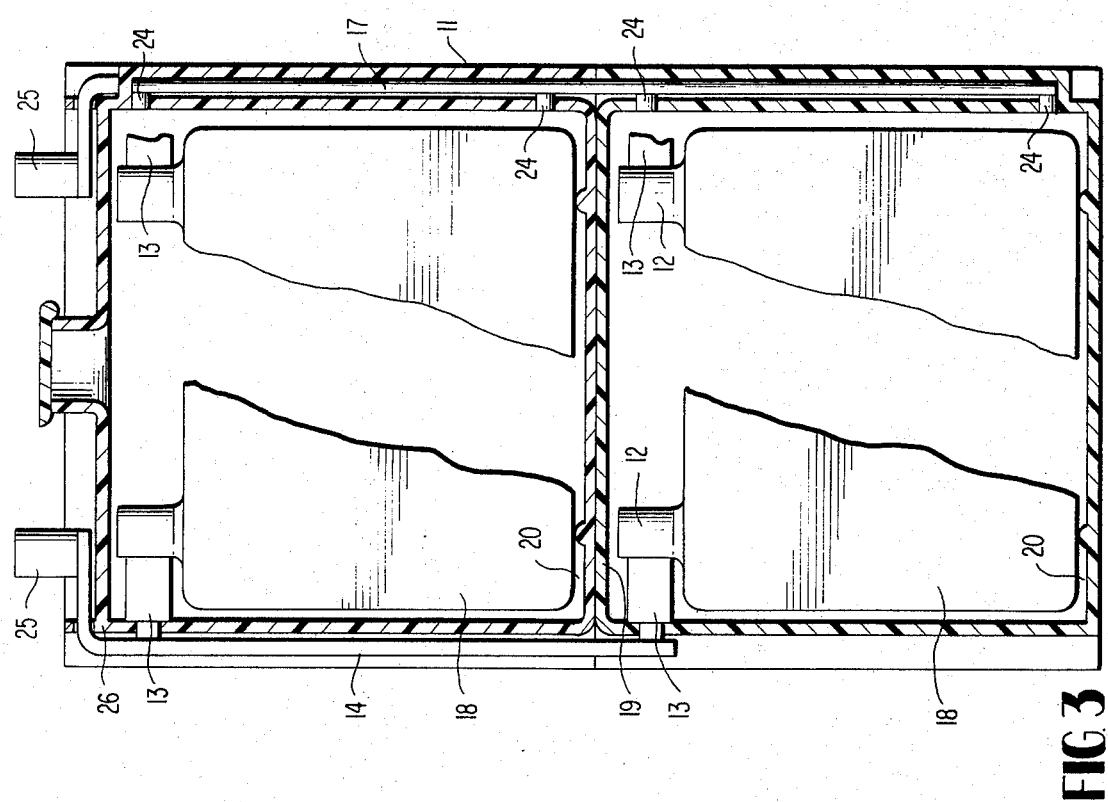
FIG. 3 is a view similar to FIG. 1 taken along line III—III in FIG. 4 of another arrangement of storage battery cells according to the invention.
Figure 1:
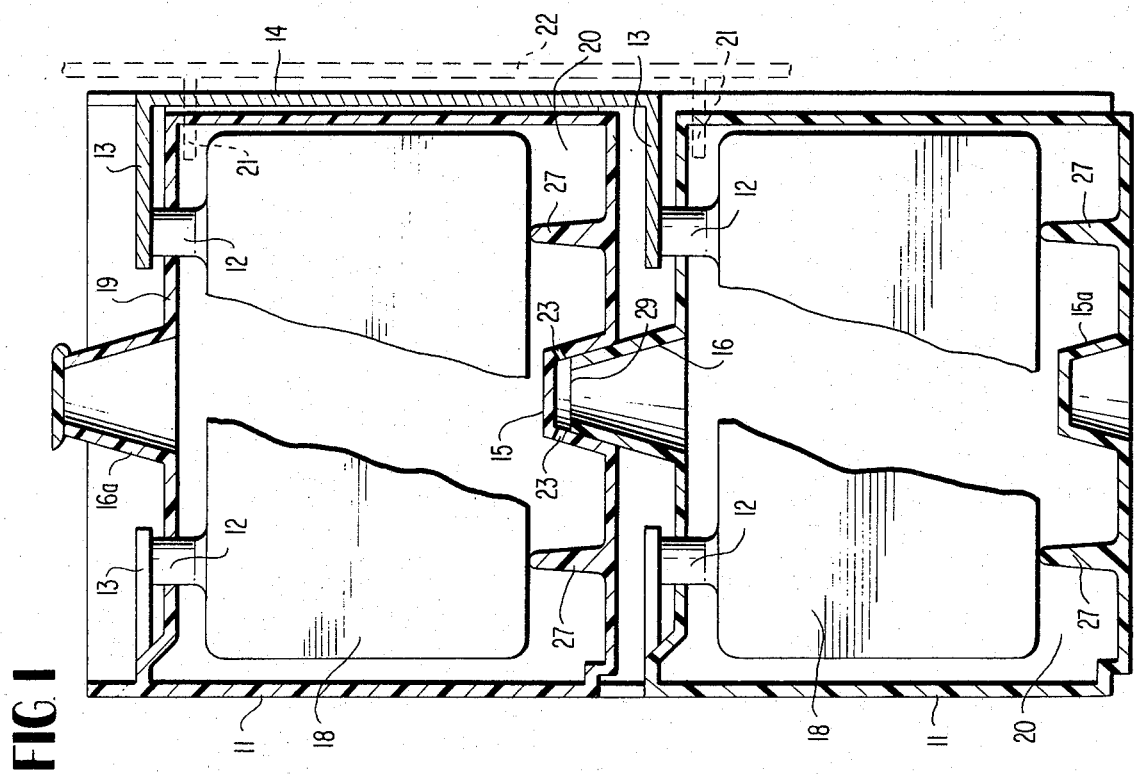
FIG. 1 is an elevation in section taken along line 1—1 of FIG. 2 showing two storage battery cells stacked one on top of the other in accordance with the invention.

In the area of the underside of the upper cells, the connectors 14, according to FIGS. 1, 2 and 3 with additional lead-through conductors 13, consist of one piece, run to and are electrically connected with the underlying cell connectors of elements 18. In this way, the elements of the elementary cells arranged on top of one another are connected with one another by electric connecting lines running outside the electrolyte chamber 20.

The electrolyte chambers 20 of the cells that are stacked one on top of the other are in fluid communication with one another. One suitable construction involves the use of identations 15 in the bottom side or on the undersides in case of the embodiment as in FIGS. 1 and 2, while there are raised portions 16 on the top sides. Both the indentations 15, as well as the raised portions 16, have conical shapes and are so dimensioned that the raised portions 16 have a sealing engagement with said indentations 15 in the bottom member.

The indentations 15 of the bottom and the raised portions 16 coming into engagement with one another, have openings 23 or 29 by which the electrolyte chambers 20 are connected. The indentations 15a or raised portions 16a, on the contrary, are closed.

In the case of the embodiment of FIG. 3, the poles are brought out laterally, while the connection of the electrolyte chambers is provided by a connecting pipe 17 sunk into an indentation 30. Transverse bores 24 branch off from the pipes 17 on the bottom or at the level of the electrolyte to the inside of the cell, so that an electrolyte replenishment and degassing can take place at the same time. The connecting pipe may be open on top while the covers and bottom may be flat.

According to FIG. 3, an attachment 26 is arranged on the upper cell, which has the terminal poles 25, and makes an electrical connection with the connectors 14. A connection 22 is disposed in the cover of the top cell.

In the case of other embodiments, the covers and bottoms have recesses or elevations which fit into one another and which can be suitably sealed as by means of liquid, plastic or solid rubber or plastic compounds. At the same time, it is possible to shift the leadthroughs of lead through the cover to the sides and to connect only the middle area of the covers by such elevations or indentations with bottoms of the boxes of the superposed cells.

Figure 5:
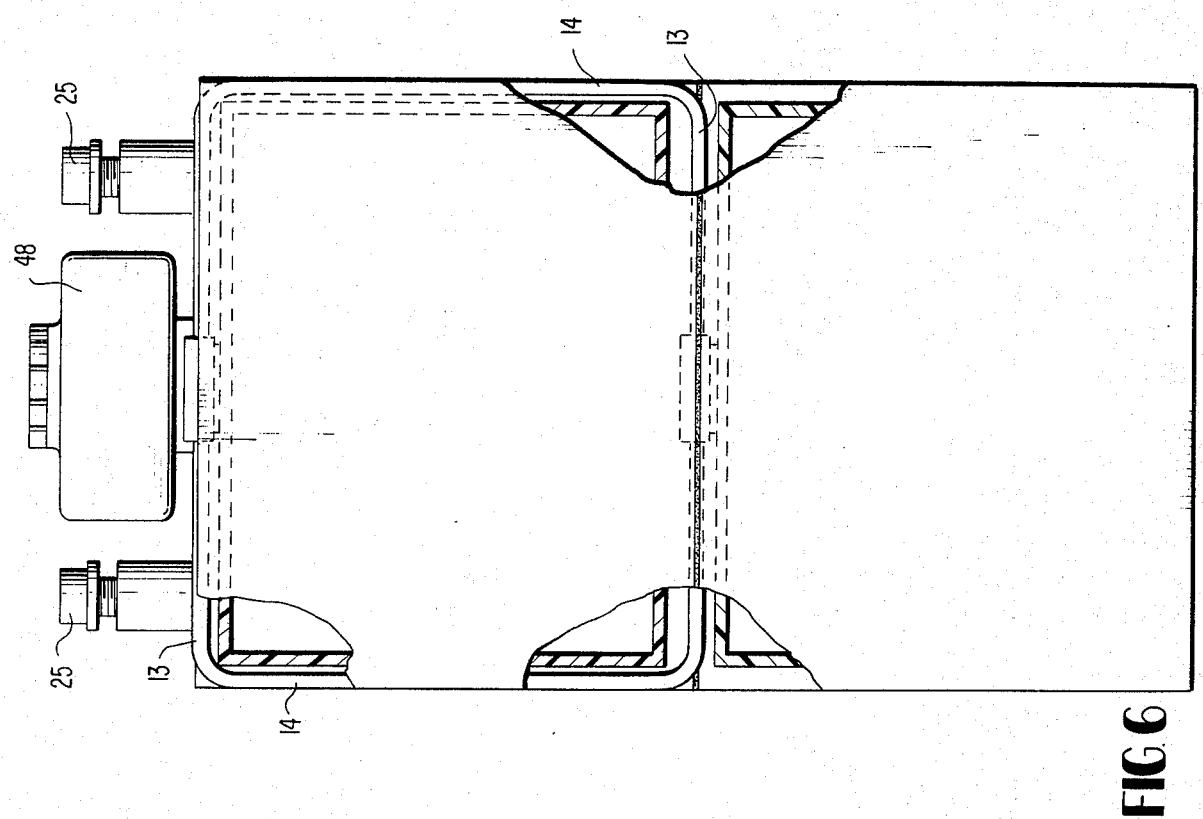
FIG. 5 is an elevation in section of yet another arrangement of two storage battery cells stacked one on top of the other according to the invention.
Figure 6:
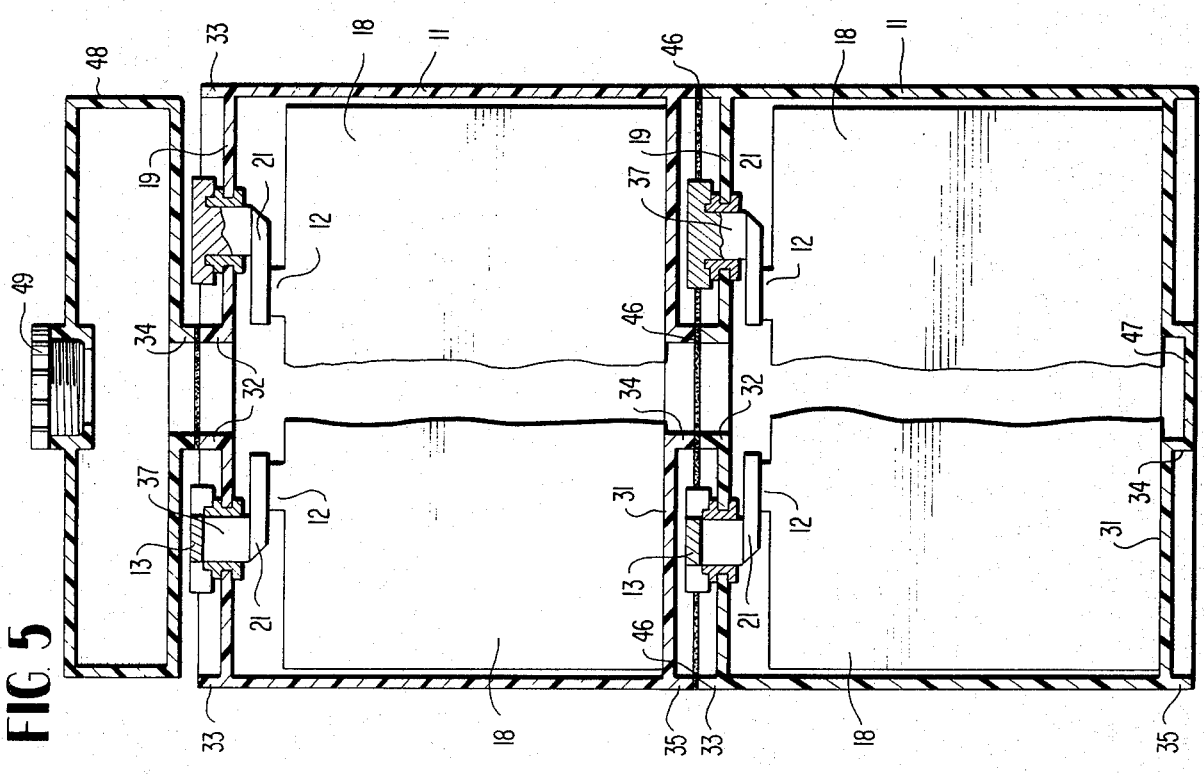
FIG. 6 is a partly broken open sideview of the battery of FIG. 5.

In the case of the embodiment of FIGS. 5 and 6, inside rims 32 and outside rims 33 extend upwards from the covers 19 of the housings 11. Analogously, the rims 34 and outside rims 35 project from the bottoms 31 of the housings 11. The length of the rims 32, 33, 34 and 35 is such that the connecting poles 37 will find room in the spaces created by the rims in case of piled up cells, as is illustrated in FIG. 5. The upper rims 32, 33 are aligned with the lower rims 34, 35 so that in case of putting two housings 11 one on top of the other, a cuboid structure having smooth walls on the outside, develops while the inside rims 32, 34 constitute a passage for the electrolyte.

The rims 32, 34 or 33, 35 are glued or welded together along their connecting lines 46, so that a liquid-tight closure on all sides will be achieved.

The inside rim 34 of the bottom-most cell projecting downwards is closed in a leak-proof manner by cover 47. The rim 34 and the cover 37, however, may be fabricated in one piece with the bottom 31, even during production if desired.

A compensating container 48, which on its underside has rims 34 matching the inside rims 32, is joined together tightly with the storage battery cell below it, and may be placed on the storage battery cells placed on top of one another, according to FIGS. 5 and 6. The compensating container 48 may have a screw type lock 49 on its topside for electrolyte filling or replenishing and for allowing escape of the generated gases.

Figure 7:
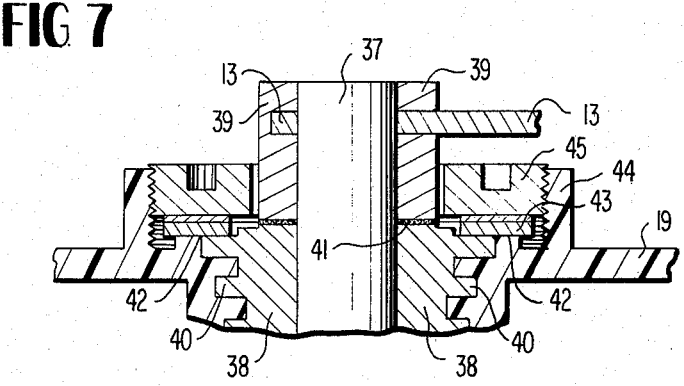
FIG. 7 is a view in cross section at an enlarged scale, showing a preferred construction for the lead-through of the pole in the casing of a storage battery cell of the invention.
Figure 8:
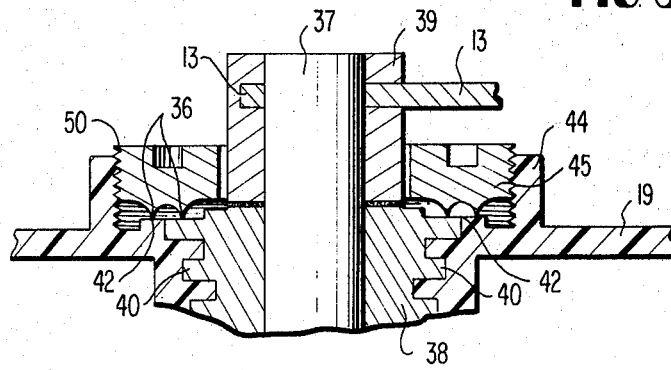
FIG. 8 is a view similar to FIG. 7 of a modified form of the leadthrough construction.

FIGS. 7 and 8 show preferred embodiments of the lead poles 37 through the cover 19.

A lead bushing 38 is disposed around a lead pole 37, which bushing is securely anchored to the cover by way of engagement with the annular grooves 40 of the cover 19. A welding together of the lead pole 37 and of the lead bushing 38 as well as of the lead head 39 may take place along the line 41. The connection of conductors 13 with the pole 37 or the lead head 39 may be in the manner shown.

The connecting gap 42 between lead bushing 38 and cover 19 is covered, according to the embodiment of FIG. 7, by a flat gasket ring 43 which is pressed downwards by an eyebolt 45, which is screwed into the cover 19 with a sprayed-on connection 44 with inside thread. In this manner, any leaking out of the electrolyte from the connecting line 42 is avoided completely.

In the case of the embodiment shown in FIG. 8, the gasket ring 43 of the design according to FIG. 7 is omitted. Instead, the eyebolt 45 is shown to have two annular projections 36 on its underside, which are concentric with the eyebolt 45 and the lead pole 37. The one projection 36 extends radially outside, the other projection radially inside the connecting line 42. In this way, a tunnel-like hollow space 50 develops between the two projections 36. When tightening the screw 45 into the thread of the connecting piece 44, the relatively angular projections 36 tap the surface of the material lying below it so that the connecting line 42 will be perfectly sealed toward the outside.

In the embodiment according to FIGS. 5 and 6, the individual connecting poles may be connected with one another electrically by leadthrough conductors 13 and vertical connectors 14 (see FIG. 6). While the compensating container 48 is narrow, the connecting poles 25 still have room beside it.

In summary, by constructing higher storage batteries by means of elementary storage battery cells according to the invention, a considerable simplification in fabrication and consequent reduction in cost results. In the case of the same height, a storage battery built from cells according to the invention, has considerably reduced internal resistance conditions, as compared to the situation where only one cell of the same height was provided. As a result, the uniform discharge of all parts will be promoted.

The lead-sheathed copper conductors in flat or round design serve as very effective conductors. The conductors at the same time will advantageously be covered with shrinking tubes. It is particularly advantageous whenever the connectors are sunk into the lateral walls of the housing, and at the same time, the connectors can conveniently be poured into synthetic resin.

In order to produce a perfect connection from the pole bridges to the connectors, lead-through lines with a cross-section selected suitably large, will run advantageously from the cell connector laterally to the vertical connectors.

In order to ensure a perfect seat and a perfect alignment of storage battery cells stacked on top of one another, cells have on the facing top and bottom walls, raised portions and recesses complementary to one another. Also, a cover configuration which is elevated circularly on the sides, is advantageous so that a trough is provided which can be filled up with synthetic resin. The bottom part of the upper cell is made such that it fits into the recesses of the cover of the lower cell, and thus an effective seal is ensured at all times.

In this connection, a particularly advantageous construction is provided when the cell has on its underside an apertured conical indentation in the bottom wall, and on its top wall, a likewise conically shaped projecting surface fitting into a correspondingly shaped recess in the bottom of a substantially identical cell disposed above. The cell is open on top in order to establish a connection with the electrolyte spaces of adjacent cells by way of the apertures in the recess in the bottom. During stacking of two such storage battery cells, therefore, both its electrolyte spaces are automatically connected with one another, whereby an excellent sealing is guaranteed.

Alternatively, vertical pipes may be sunk into the lateral walls, which are connected with transverse bores to the electrolyte space, provided in the lower area and in the area of the acid level, whereby the facing covers of the cells are flat and closed.

The topmost cell in the stack has the connectors bent toward the inside above the cover and an attachment member is provided for the connecting poles and the bent ends of the connectors.

In some embodiments, a protruding rim has been provided on the outside and inside of the cover and the bottom, which can be connected in a liquid-tight alignment with a corresponding rim of a similar cell set above or below it and by pressure, glueing or welding. In this manner, free spaces for the attachment of a solder connector is provided on the outside and the space on the inside closed within itself.

The spaces enclosed by the closed inside rims may be filled with a porous material, which filters liquid electrolyte, but retains separations from the elements above them. The outside rims are effectively aligned with the outside walls of the housing and have openings to pass through the conductors, so that the exterior has the appearance of a block with smooth walls after connection of variously superimposed cells.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A storage battery comprising a plurality of cells supported one upon another, each cell including a cuboid housing of non-conducting material with a liquid electrolyte and positive and negative plate elements therein, the top and bottom sides of said housings having shapes that are complementary to each other in such a way that said cells stack compactly one upon another, means for providing an open communication path between the liquid electrolyte in said housings of adjoining cells, and electrically conducting means including positive and negative terminal conductors extending through said housings in liquid-sealing relation thereto and electrical conductors outside the housings of said cells interconnecting plate elements of like polarity of adjoining cells.

2. A storage battery as defined in claim 1, wherein said electrical conductors outside the housings of said cells are of copper encased in lead.

3. A storage battery as defined in claim 1, wherein said electrical conductors are covered with shrinking tubes.

4. A storage battery as defined in claim 1, wherein said cell housings are provided with substantially vertically extending recesses in lateral sides thereof and said electrical conductors are disposed in said recesses.

5. A storage battery as defined in claim 4, wherein said electrical conductors are embedded in synthetic resin disposed in said recesses.

6. A storage battery as defined in claim 1, wherein said terminal conductors extending through said housings extend laterally to said conductors outside said housings.

7. A storage battery as defined in claim 1, wherein the complementary shapes of said top and bottom sides are such that the housings of adjoining cells resist lateral movement therebetween.

8. A storage battery as defined in claim 1, wherein the top and bottom sides of said housings have elevations and indentations, respectively, that complement each other.

9. A storage battery as defined in claim 8, wherein said elevations and indentations are conical in shape with an elevation in the top side of one adjoining cell fitting tightly into the indentation in the bottom side of the adjoining cell supported thereon and said elevations and indentations between adjoining cells each has at least one opening therein to provide communication between the electrolyte in said adjoining cells.

10. A storage battery as defined in claim 1, wherein the lateral walls of said housings include substantially vertical passages communicating with the interiors of the housings through lateral passages and said vertical passages of adjoining cells intercommunicate to provide a communication path between the electrolyte in said adjoining cells.

11. A storage battery as defined in claim 10, wherein each of said adjoining cells includes a lateral passage in the lower area of said cell and a lateral passage in the vicinity of the level of the electrolyte in said cell.

12. A storage battery as defined in claim 11, wherein the topmost of said adjoining cells includes a passage for introducing electrolyte into said cells and degassing, and said electrical conductors outside the housing of said topmost cell each includes a portion extending inwardly above the top side of said topmost cell and a terminal pole electrically connected to said portion.

13. A storage battery as defined in claim 1, wherein said positive and negative terminal conductors extend through the top side of the housing of the lower of said adjoining cells into a space between the housings of said adjoining cells and synthetic resin is cast in said space about said terminal conductors.

14. A storage battery as defined in claim 1, wherein the top and bottom sides of said housings each have edges projecting outwardly therefrom at their outer peripheries and in a closed configuration spaced from and inside said outer peripheries, the opposing projections on said top and bottom sides of adjoining cells being in alignment and connected in fluid-tight relationship; and the adjoining top and bottom sides being open within said inner configuration to provide an open communication path between the electrolyte in the housings of said adjoining cells.

15. A storage battery as defined in claim 14, wherein said opening within said inner configuration is covered with a porous material which passes liquid material but rejects solid precipitations from said plate elements.

16. A storage battery as defined in claim 15, wherein said porous material is an acid resistant fabric.

17. A storage battery as defined in claim 14, wherein said edges at the outer peripheries of said top and bottom sides are aligned with the lateral walls of said housings and include perforations for passage of said electrically conducting means.

18. A storage battery as defined in claim 14, wherein a compensating container, having a continuous projection on its bottom side corresponding to the inner configurations of the projections on said cell housings and an opening within said projection, is disposed on the upper of said adjoining cells having an opening within its inner projection in position to communicate with the electrolyte in said upper cell, said container including a closable opening on its top side to permit introducing electrolyte into said cells and degassing said cells.

19. A storage battery as defined in claim 1, wherein said terminal conductors include cylindrical lead members extending through top sides of said housings and sealed therein by injected lead bushings.

20. A storage battery comprising a plurality of cells supported one upon another, each cell including a cuboid housing of non-conducting material with a liquid electrolyte and positive and negative plates therein, the top and bottom sides of said housings having shapes that are complementary to each other in such a manner that said cells stack compactly one upon another, means for providing an open communication path between the liquid electrolyte in said housings of adjoining cells terminal connecting means interconnecting plates of the same polarity in each cell and including cylindrical lead members extending through the top sides of said housings and sealed fluid-tightly therein by injected lead bushings, and means including electrical conductors outside the housings of said cells interconnecting plates of like polarity of adjoining cells.

21. A storage battery as defined in claim 19, wherein annular grooves are formed in the top side of said housings around said cylindrical lead members and said lead bushings engage all around said annular grooves.

22. A storage battery as defined in claim 21, wherein dividing lines between the material of said top sides of said housings and said injected lead members are engaged by sealing rings, and the top sides of said housings are provided with internally threaded portions concentric with and radially spaced from said cylindrical lead members and means are threaded into said internally threaded portions for exerting sealing pressure on said sealing rings.

23. A storage battery as defined in claim 21, wherein said top sides of said housings are provided with internally threaded portions outside the dividing line between the material of said top sides of said housings and said lead bushings and concentric with and radially spaced from said cylindrical lead members, and means are threaded into said internally threaded portions for exerting sealing pressure at said dividing line.

24. A storage battery as defined in claim 23, wherein said means threaded into said internally threaded portions each include two spaced annular projections, the outer of said projections sealingly engaging said top side of the corresponding said housing outside said dividing line and the inner of said projections sealingly engaging the corresponding said lead bushing inside the dividing line.

25. A storage battery cell comprising a cuboid housing of non-conducting material with a liquid electrolyte and positive and negative plates therein, the top and bottom sides of the housing having shapes that are complementary to each other in such manner that the cell may be stacked compactly upon or under another cell of similar construction means in said housing providing open communication between the liquid electrolyte therein and the liquid electrolyte in the housing of an adjoining cell of similar construction, terminal means interconnecting plates of like polarity in said cell and including cylindrical lead members extending through the top side of said housing and sealed therein by injected lead bushings, a member on the top said of said housing, outside the dividing line between the material of said top side of said housing and said lead bushings, provided with internally threaded portions concentric with and radially spaced from said cylindrical lead members, and annular means threaded into said internally threaded portions for exerting sealing pressure at said dividing line.

26. A storage battery cell as defined in claim 25, wherein said annular means threaded into said internally threaded portions each include two spaced annular projections, the outer of said projections sealingly engaging said top side of said housing outside said dividing line and the inner of said projections sealingly engaging the corresponding said lead bushings.

27. A storage battery cell as defined in claim 25, wherein said threaded annular means is of a plastic material having the strength necessary for making screw connection with said internally threaded member while still being resilient enough to impart liquid sealing properties to said annular projections.

* * * * *